United States Patent
Ross et al.

(10) Patent No.: US 12,528,579 B2
(45) Date of Patent: Jan. 20, 2026

(54) TILTING HEXROTOR AIRCRAFT

(71) Applicant: Bell Textron Inc., Fort Worth, TX (US)

(72) Inventors: Brent C. Ross, Flower Mound, TX (US); Kirk L. Groninga, Keller, TX (US); Steven R. Ivans, Ponder, TX (US); Steve R. Schafer, Fort Worth, TX (US); Brad Joseph Passe, Irving, TX (US); Nicholas Ralph Carlson, Dallas, TX (US); Kip Gregory Campbell, Hurst, TX (US); Bradley Paul Regnier, Fort Worth, TX (US); Steven G. Hagerott, Wichita, KS (US)

(73) Assignee: Textron Innovations Inc., Providence, RI (US)

( * ) Notice: Subject to any disclaimer, the term of this patent is extended or adjusted under 35 U.S.C. 154(b) by 859 days.

(21) Appl. No.: 17/571,936

(22) Filed: Jan. 10, 2022

(65) Prior Publication Data

US 2022/0324558 A1    Oct. 13, 2022

Related U.S. Application Data

(63) Continuation-in-part of application No. 17/216,591, filed on Mar. 29, 2021, now Pat. No. 12,168,508.

(51) Int. Cl.
*B64C 29/00* (2006.01)
*B64C 9/20* (2006.01)

(52) U.S. Cl.
CPC .......... *B64C 29/0033* (2013.01); *B64C 29/00* (2013.01); *B64C 9/20* (2013.01)

(58) Field of Classification Search
CPC ..... B64C 29/0033; B64C 39/04; B64C 39/08; B64C 2001/0045; B64C 39/12; B64D 27/24
See application file for complete search history.

(56) References Cited

U.S. PATENT DOCUMENTS

| 8,485,464 | B2 | 7/2013 | Kroo |
| 8,708,273 | B2 | 4/2014 | Oliver |
| 9,120,561 | B2 | 9/2015 | Armer et al. |
| 10,183,744 | B2 | 1/2019 | Gamble |
| 10,501,173 | B1 | 12/2019 | Douglas et al. |
| 10,894,599 | B1 | 1/2021 | Popiks |
| 10,994,829 | B2 | 5/2021 | Duffy et al. |

(Continued)

FOREIGN PATENT DOCUMENTS

| EP | 4105124 A1 | 12/2002 |
| WO | 2020060839 A1 | 3/2020 |

*Primary Examiner* — Richard Green
*Assistant Examiner* — Steven J Shur
(74) *Attorney, Agent, or Firm* — Akona IP PC (57) ABSTRACT

One embodiment is an aircraft including a fuselage; a wing connected to the fuselage; first and second booms connected to the wing on opposite sides of the fuselage; first and second forward propulsion systems attached to forward ends of the first and second booms; first and second aft propulsion systems fixedly attached proximate aft ends of the first and second booms; and first and second wing-mounted propulsion systems connected to outboard ends of wings; wherein the first and second wing-mounted propulsion systems are tiltable between a first position when the aircraft is in a hover mode and a second position when the aircraft is in a cruise mode.

17 Claims, 6 Drawing Sheets

(56) References Cited

U.S. PATENT DOCUMENTS

| | | |
|---|---|---|
| 11,136,115 B2 | 10/2021 | Fenny et al. |
| 11,174,019 B2 | 11/2021 | Moore et al. |
| 11,279,478 B2 | 3/2022 | Fenny et al. |
| 2013/0092799 A1* | 4/2013 | Tian ...................... B64D 27/24 |
| | | 244/7 R |
| 2014/0158815 A1 | 6/2014 | Renteria |
| 2015/0136897 A1 | 5/2015 | Seibel et al. |
| 2016/0236774 A1 | 8/2016 | Niedzballa et al. |
| 2017/0240274 A1 | 8/2017 | Regev |
| 2018/0079493 A1* | 3/2018 | Anderson ............. B64C 23/072 |
| 2020/0148347 A1* | 5/2020 | Bevirt .................... B64C 11/46 |
| 2020/0354046 A1 | 11/2020 | Knoll et al. |
| 2020/0354048 A1 | 11/2020 | Melo et al. |
| 2020/0398983 A1 | 12/2020 | Singh et al. |
| 2021/0107620 A1* | 4/2021 | Weekes .................... B64C 1/30 |
| 2021/0107640 A1 | 4/2021 | Baity et al. |
| 2021/0206483 A1 | 7/2021 | Lee et al. |
| 2021/0253234 A1* | 8/2021 | Tao .................... B64C 29/0025 |
| 2022/0009626 A1* | 1/2022 | Baharav .................. B64C 27/26 |

* cited by examiner

TILTING HEXROTOR AIRCRAFT

CROSS-REFERENCE TO RELATED APPLICATION

This application claims the benefit of and priority to U.S. patent application Ser. No. 17/216,591, filed Mar. 29, 2021, entitled "TILTING HEXROTOR AIRCRAFT," which is incorporated herein by reference in its entirety.

TECHNICAL FIELD

This disclosure relates in general to the field of tiltrotor aircraft and, more particularly, though not exclusively, to tilting hexrotor arrangements for such aircraft.

BACKGROUND

An electric vertical takeoff and landing (eVTOL) is a type of aircraft that uses electric power to supply rotational energy through electric motor(s) to props, rotors, or fans in an aircraft propulsion system for enabling the aircraft to hover, takeoff, and land vertically. Because of their versatility and lack of a need for a runway, eVTOLs are particularly useful for providing urban air mobility. As used herein, the term eVTOL also includes VTOLs that use hybrid-electric (with an engine running a generator producing electricity and battery stored power) or turbo electric (an engine running a generator providing all power required) propulsion systems. One particular type of eVTOL is an electric tiltrotor aircraft.

BRIEF DESCRIPTION OF THE DRAWINGS

To provide a more complete understanding of the present disclosure and features and advantages thereof, reference is made to the following description, taken in conjunction with the accompanying figures, in which like reference numerals represent like elements.

DETAILED DESCRIPTION

The following disclosure describes various illustrative embodiments and examples for implementing the features and functionality of the present disclosure. While particular components, arrangements, and/or features are described below in connection with various example embodiments, these are merely examples used to simplify the present disclosure and are not intended to be limiting. It will of course be appreciated that in the development of any actual embodiment, numerous implementation-specific decisions must be made to achieve the developer's specific goals, including compliance with system, business, and/or legal constraints, which may vary from one implementation to another. Moreover, it will be appreciated that, while such a development effort might be complex and time-consuming; it would nevertheless be a routine undertaking for those of ordinary skill in the art having the benefit of this disclosure.

In the specification, reference may be made to the spatial relationships between various components and to the spatial orientation of various aspects of components as depicted in the attached drawings. However, as will be recognized by those skilled in the art after a complete reading of the present disclosure, the devices, components, members, apparatuses, etc. described herein may be positioned in any desired orientation. Thus, the use of terms such as "above", "below", "upper", "lower", "top", "bottom", or other similar terms to describe a spatial relationship between various components or to describe the spatial orientation of aspects of such components, should be understood to describe a relative relationship between the components or a spatial orientation of aspects of such components, respectively, as the components described herein may be oriented in any desired direction. When used to describe a range of dimensions or other characteristics (e.g., time, pressure, temperature, length, width, etc.) of an element, operations, and/or conditions, the phrase "between X and Y" represents a range that includes X and Y.

Additionally, as referred to herein in this specification, the terms "forward", "aft", "inboard", and "outboard" may be used to describe relative relationship(s) between components and/or spatial orientation of aspect(s) of a component or components. The term "forward" may refer to a spatial direction that is closer to a front of an aircraft relative to another component or component aspect(s). The term "aft" may refer to a spatial direction that is closer to a rear of an aircraft relative to another component or component aspect(s). The term "inboard" may refer to a location of a component that is within the fuselage of an aircraft and/or a spatial direction that is closer to or along a centerline of the aircraft (wherein the centerline runs between the front and the rear of the aircraft) or other point of reference relative to another component or component aspect. The term "outboard" may refer to a location of a component that is outside the fuselage of an aircraft and/or a spatial direction that farther from the centerline of the aircraft or other point of reference relative to another component or component aspect.

Further, the present disclosure may repeat reference numerals and/or letters in the various examples. This repetition is for the purpose of simplicity and clarity and does not in itself dictate a relationship between the various embodiments and/or configurations discussed. Example embodiments that may be used to implement the features and functionality of this disclosure will now be described with more particular reference to the accompanying FIGURES.

Described herein are various configurations for hexrotor aircraft. In accordance with features of embodiments described herein, the drive system includes one or more fixed electric motors coupled to an off-axis tilting gearbox. The tilting configuration may have a motor attached to a drive system for reduction of rpm or the motor itself may be direct drive directly turning the prop at the desired speed. Tilting of the rotor assemblies can take place with respect to the stationary motors and wing or other stationary structure of the aircraft. The motors or motors with drive may tilt with the rotors/props or the motor may remain stationary with the prop and a portion of the drive rotating. Tilting may occur with a portion of the attached wing or boom or the wing or boom may stay fixed with only the pylon tilting.

Figure 1A:
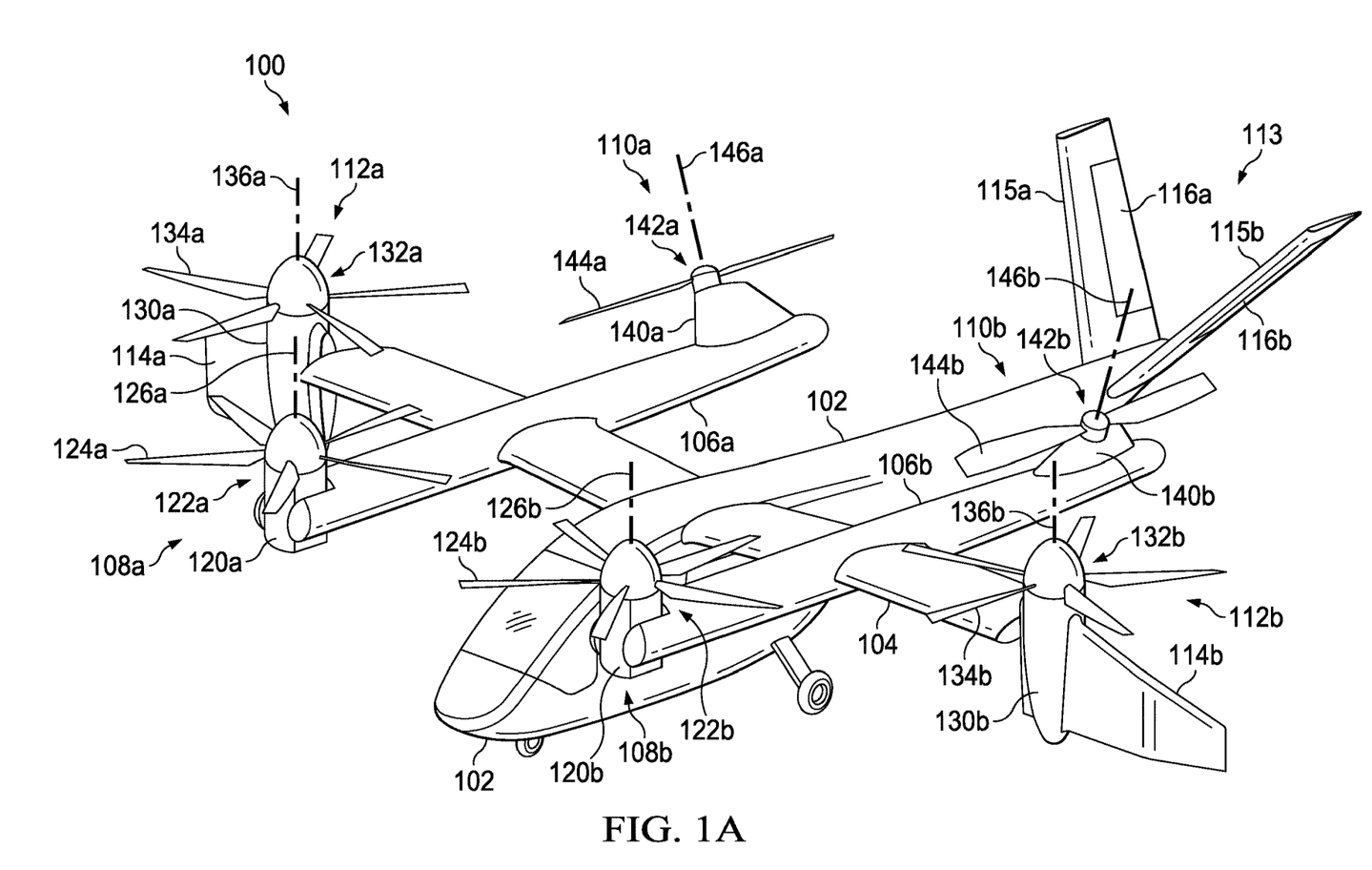
FIGS. 1A-1C illustrate a tiltrotor aircraft having a tilting hexrotor configuration in accordance with embodiments described herein.

The tilting pylons in certain ones of the following illustrative example include forward tilting pylon on a boom and typically aft rotors above or below the boom. The wing tip rotor may tilt with a portion of the wing rotating with it (as shown in FIG. 1A). When rotating with the rotating pylon, all of the wing or any percentage of the wing may rotate. Allowing the wing to rotate minimizes download in hover mode due to impingement of the rotor stream on exposed airframe/wing surfaces, reducing net rotor lift and power required in hover.

Figure 1B:
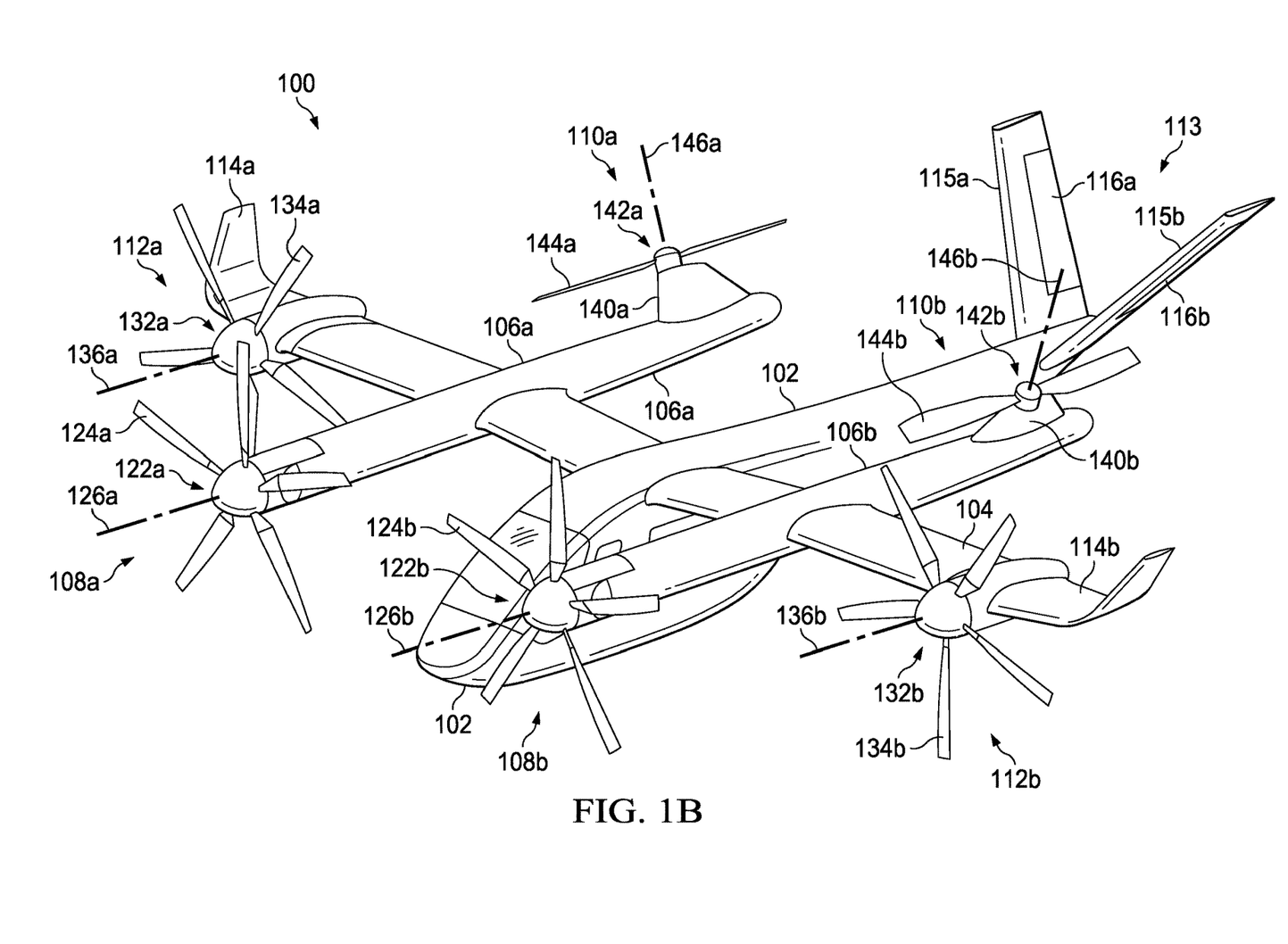
Figure 1C:
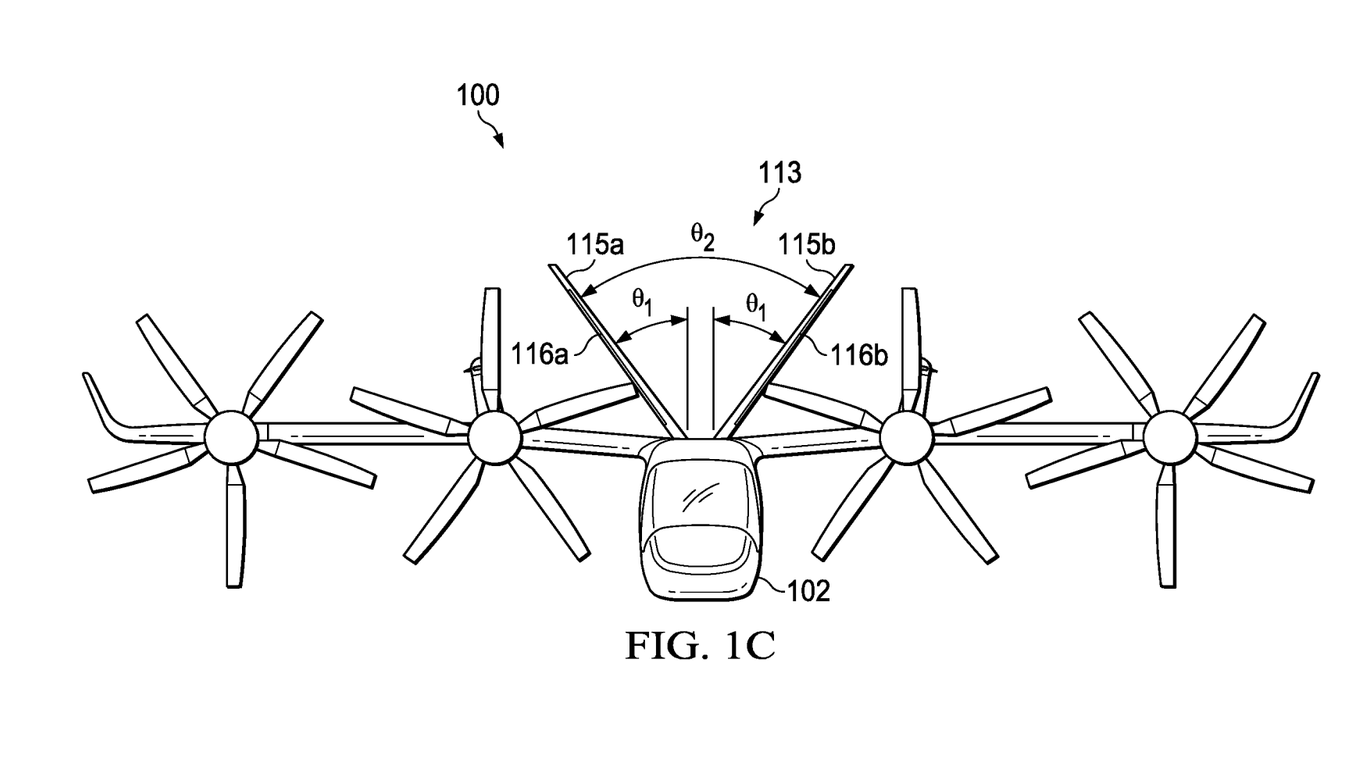

FIGS. 1A-1C illustrate an example tiltrotor aircraft 100 that is convertible between a VTOL or hover (also commonly referred to as helicopter) mode (shown in FIG. 1A), which allows for vertical takeoff and landing, hovering, and low speed directional movement, and a cruise (also commonly referred to as airplane) mode (shown in FIG. 1B), which allows for forward flight as well as horizontal takeoff and landing. Aircraft 100 includes a fuselage 102, wing 104, and booms 106a, 106b, connected to the wing on opposite sides of the fuselage 102. In accordance with features of embodiments described herein, aircraft further includes three pairs of propulsion systems, including forward propulsion systems 108a, 108b, adjacent to the forward end of the fuselage 102, aft propulsion systems 110a, 110b, adjacent to the aft end of the fuselage 102, and a pair of wing-mounted propulsion systems 112a, 112b, proximate opposite tips of wing 104. In the illustrated embodiment, forward propulsion systems 108a, 108b, are attached to forward ends of booms 106a, 106b, respectively, and aft propulsion systems 110a, 110b, are attached to booms 106a, 106b, respectively, proximate aft ends thereof.

Aircraft 100 further includes a tail assembly 113 at an aft end thereof. In the embodiment illustrated in FIGS. 1A-1C, the tail assembly 113 is disposed on the aft end of the fuselage 102 and comprises a V-tail configuration including a pair of airfoils 115a, 115b, which extend from the top surface of the fuselage 102 at the aft end thereof. As best shown in FIG. 1C, airfoils 115a, 115b, each extend outboard at an angle $\Theta_1$ from vertical, where an absolute value of the angle $\Theta_1$ is less than 90 degrees. Airfoils 115a, 115b, form an angle $\Theta_2$ with one another. Although as illustrated herein, the tail assembly 113 comprises a dihedral, or upward, V-tail, it will be recognized that in alternative embodiments, the tail assembly may comprise an anhedral, or downward, V-tail. In particular embodiments, angle $\Theta_2$ may be between 30 degrees and 330 degrees. Control surfaces 116a, 116b, are disposed on trailing edges of airfoils 115a, 115b, and may be implemented as "ruddervators" for providing yaw and pitch control in certain embodiments. In certain embodiments, each of the control surfaces 116a, 116b, may comprise multiple independently controllable segments.

In the illustrated embodiment, each forward propulsion system 108a, 108b, includes a drive system housing comprising a pylon 120a, 120b, and a rotatable open rotor assembly 122a, 122b, comprising a plurality of rotor blades 124a, 124b, connected to a rotor mast and configured to rotate about a rotor axis 126a, 126b. As shown in FIGS. 1A and 1B, each rotor assembly 122a, 122b, includes five (5) rotor blades; however, it should be recognized that more or fewer blades may be implemented without departing from the spirit and the scope of the embodiments described. Rotation of rotor blades 124a, 124b, about rotor axis 126a, 126b, generates lift while operating in helicopter mode and thrust while operating in airplane mode. Each pylon 120a, 120b, may house one or more electric motors therein configured to produce rotational energy that drives the rotation of rotor assembly 122a, 122b. Alternatively, each pylon 120a, 120b, may house a gearbox therein that drives the rotation of rotor assembly 122a, 122b, wherein the gearbox receives rotational energy from a driveshaft or gear. The driveshaft may be driven remotely by an electric motor located some distance away or may be directly coupled to electric motor.

In the illustrated embodiment, each wing-mounted propulsion system 112a, 112b, includes a drive system housing comprising a pylon 130a, 130b, and a rotatable open rotor assembly 132a, 132b, comprising a plurality of rotor blades 134a, 134b, connected to a rotor mast and configured to rotate about a rotor axis 136a, 136b. As shown in FIGS. 1A and 1B, each rotor assembly 132a, 132b, includes five (5) rotor blades; however, it should be recognized that more or fewer blades may be implemented without departing from the spirit and the scope of the embodiments described. It should also be recognized that rotor assemblies 132a, 132b, may include a different number of rotor blades than rotor assemblies 122a, 122b. Rotation of rotor blades 134a, 134b, about rotor axis 136a, 136b, generates lift while operating in helicopter mode and thrust while operating in airplane mode. Each pylon 130a, 130b, may house one or more electric motors therein configured to produce rotational energy that drives the rotation of rotor assembly 132a, 132b. Alternatively, each pylon 130a, 130b, may house a gearbox therein that drives the rotation of rotor assembly 132a, 132b, wherein the gearbox receives rotational energy from a driveshaft.

In the illustrated embodiment, each aft propulsion system 110a, 110b, includes a drive system housing comprising a pylon 140a, 140b, and a rotatable open rotor assembly 142a, 142b, comprising a plurality of rotor blades 144a, 144b, connected to a rotor mast and configured to rotate about a rotor axis 146a, 146b. As shown in FIGS. 1A and 1B, each rotor assembly 142a, 142b, includes two (2) rotor blades; however, it should be recognized that more or fewer blades on a single or stacked rotor may be implemented without departing from the spirit and the scope of the embodiments described. Rotation of rotor blades 144a, 144b, about rotor axis 146a, 146b, generates lift while operating in helicopter mode. While operating in cruse mode, the rotor blades 144a, 144b, may cease rotation or be caused to rotate in a minimum power state. Each pylon 140a, 140b, may house one or more electric motors therein configured to produce rotational energy that drives the rotation of rotor assembly 142a, 142b. Alternatively, each pylon 140a, 140b, may house a gearbox therein that drives the rotation of rotor assembly 142a, 142b, wherein the gearbox receives rotational energy from a driveshaft. It will be recognized that while rotor assemblies 142a, 142b, are illustrated as being disposed above (i.e., on top of) booms 104a, 104b, they may alternatively be disposed below (i.e., on the underside of) booms and the distance from rotor to boom may vary or there may be rotor above and below the pylon as yet another alternative.

The fairings of pylons 140a, 140b, are designed to reduce the rotor-boom noise. In particular, there are two parameters that influence the acoustics of rotors over booms, including the relative width W of the boom surface (narrow is better than wide) and the ratio of the height of the rotor h to the rotor radius R (the higher the better). The fairings function to elevate the rotor above the boom, thereby to increase h/R and lower the acoustic impact of the rotor over the boom, and to cover the mast to prevent the elevated rotor from being overly penalizing in drag, as the fairing has lower drag than an exposed mast. The fairing is also much narrower (lower relative W) than original boom as well, which provides additional acoustic advantages.

As will be described in greater detail below with reference to FIGS. 3A and 3B, as an alternative to using fairings to reduce rotor-boom noise, the length of the booms 106a, 106b, may be shortened such that the aft ends thereof are as close as possible to hubs of rotor assemblies 142a, 142b, thereby minimizing overlap of the aft arc of the rotor with the boom, resulting in reduced rotor-boom interaction and reduced rotor-boom noise.

In accordance with features of embodiments described herein, and as illustrated in FIGS. 1A and 1B, wing-mounted propulsion systems 112a, 112b, are connected to inboard ends of wing tips, or winglets, 114a, 114b, attached to outboard ends of wing 104. In certain embodiments, wing tips 114a, 114b, may be canted, while in other embodiments, wing tips 114a, 114b, extend in substantially the same plane as wing 104. In some embodiments, wing tips 114a, 114b, may be omitted. Wing tips 114a, 114b, together with wing-mounted propulsion systems 112a, 112b, tilt relative to wing 104 between a first position (FIG. 1A), in which propulsion systems 112a, 112b, and wing tips 114a, 114b, are configured in a hover mode, and a second position (FIG. 1B), in which propulsion systems 112a, 112b, and wing tips 114a, 114b, are configured in a cruise mode. In some embodiments, the wing 104 may carry through under the pylons such that wing tips 114a,114b remain fixed with the wing 104 as the propulsion systems 112a,112b tilt. Similarly, forward propulsion systems 108a, 108b, (and more specifically, pylons 120a, 120b) are tiltably connected to forward ends of booms 106a, 106b, such that they may be tilted between a first position (FIG. 1A), in which propulsion systems 108a, 108b, are configured in a hover mode, and a second position (FIG. 1B), in which propulsion systems 108a, 108b, are configured in a cruise mode. In accordance with features of embodiments described herein, aft propulsion systems 110a, 110b, are fixedly attached to booms 106a, 106b, proximate aft ends thereof and do not convert between hover mode (FIG. 1A) and cruise mode (FIG. 1B).

The position of rotor assemblies 122a, 122b, 132a, 132b, as well as the pitch of individual rotor blades 124a, 124b, 134a, 134b, 144a, 144b, can be selectively controlled in order to selectively control direction, thrust, and lift of aircraft 100. As previously noted, propulsion systems 108a, 108b, 112a, 112b, are each convertible, relative to fuselage 102, between a vertical position, as shown in FIG. 1A, and a horizontal position, as shown in FIG. 1B. Propulsion systems 108a, 108b, 112a, 112b, are in the vertical position during vertical takeoff and landing mode. Vertical takeoff and landing mode may be considered to include hover operations of aircraft 100. Propulsion systems 108a, 108b, 112a, 112b, are in the horizontal position during forward flight mode, in which aircraft 100 is in forward flight. In forward flight mode, propulsion systems 108a, 108b, 112a, 112b, direct their respective thrusts in the aft direction to propel aircraft 100 forward. Aircraft 100 is operable to fly in all directions during the vertical takeoff and landing mode configuration of FIG. 1A, although faster forward flight is achievable while in the forward flight mode configuration of FIG. 1B. Propulsion systems 108a, 108b, 112a, 112b, may be tiltable between the vertical and horizontal positions by actuators (not shown) that are tiltable in response to commands originating from a pilot and/or a flight control system. Each of the propulsion systems 108a, 108b, 110a, 110b, 112a, 112b, may utilize an electric motor and gearbox unit disposed within a respective pylon 120a, 120b, 130a, 130b, 140a, 140b or a direct drive motor of group of motors on the same shaft as a power source to rotate the respective rotor assembly 122a, 122b, 132a, 132b, 142a, 142b, about rotor axis 126a, 126b, 136a, 136b, 146a, 146b, via a rotor mast.

It should be noted that, although propulsion systems 108a, 108b, are shown and described as being tiltable between cruise and hover positions, those propulsion systems may be fixed in the hover positions, similarly to propulsion systems 110a, 110b. Additionally and/or alternatively, propulsion systems 112a, 112b, may be connected to opposite ends of wing 104 such that only pylons 130a, 130b, or a portion thereof, are tiltable relative to wing 104. The tiltable pylons 130a, 130b and 108a and 108b may also be differentially tiltable and may vary in power to control yaw of the aircraft whereas different thrust for roll and pitch is controlled through differential blade pitch, rpm, and motor power.

In accordance with features of embodiments described herein, when aircraft 100 is in cruise mode, rotor assemblies 142a, 142b, may cease rotation. In alternative embodiments rotor assemblies 142a, 142b, may be caused to rotate in a minimum power state when the aircraft 100 is in cruise mode. In embodiments in which propulsion systems 108a, 108b, are also fixed (i.e., do not convert between hover and cruise modes), rotor assemblies 122a, 122b, may also cease rotation when aircraft 100 is in cruise mode. Fewer active rotor assemblies in cruise mode improves propulsive efficiency of the aircraft. In addition, stopping the aft rotors avoids ingestion of the wakes from the forward rotors, which would make the aft rotors less efficient. With six rotor assemblies, a rotor assembly can be lost while still allowing aircraft 100 to hover even without motor redundancy per rotor assembly. In the event of a rotor failure, the rotor on the opposite side of the aircraft would be powered down, allowing the aircraft to hover as a quad copter with the four remaining rotors operating at elevated power levels. In accordance with features of embodiments described herein, if the aft left rotor were to fail, the forward right rotor would also be powered down, allowing the thrust on the remaining rotors to balance. Electric power to the motors allows the distributed nature of the aircraft 100 to stay weight efficient without requiring extensive cross-connects.

Figure 2:
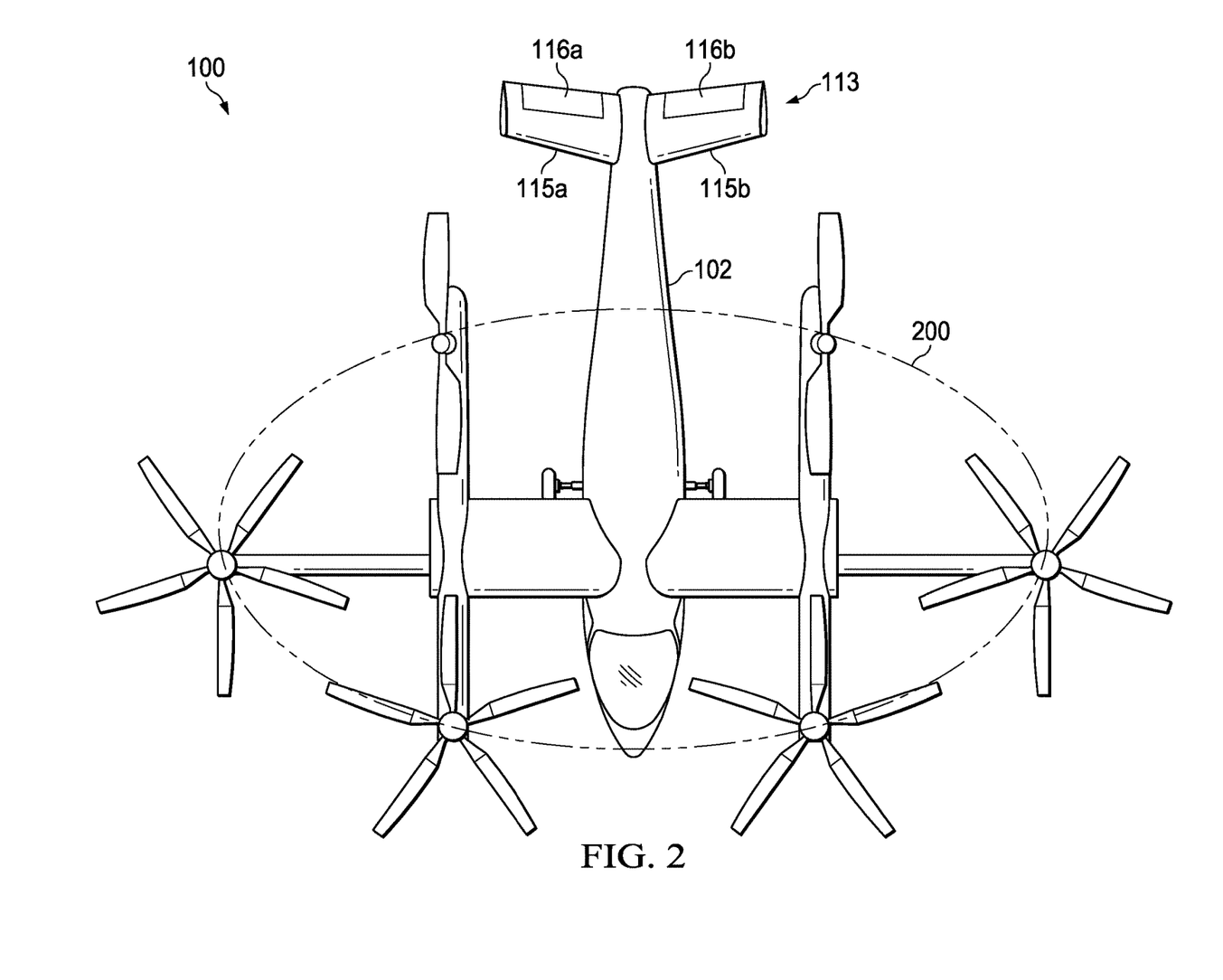
FIG. 2 illustrates a hexrotor arc arrangement of rotors of a tilting hexrotor aircraft in accordance with embodiments described herein.

Because the aircraft 100 includes six (6) rotor assemblies, the aircraft may be referred to as a "hexrotor aircraft." FIG. 2 illustrates a hexrotor arc arrangement 200 when aircraft 100 is in hover mode. In particular, to allow the minimum number of rotors and still allow loss of a rotor as a recoverable failure mechanism in a hover, the rotors are arranged in an arc arrangement both side-to-side and forward-to-aft. As a result, when one rotor is lost and a second rotor is powered down, the aircraft can still be balanced as a quad arrangement on the remaining rotors. If a linear arrangement were used, the power and balance requirements would prevent recovery on just four rotors. Multi-copters with more than six rotors may recover by offsetting opposing rotors, but six in the illustrated arc arrangement is the minimum to allow a recovery after failure and result in significant weight savings due to fewer redundant motors and rotors.

Figure 3A:
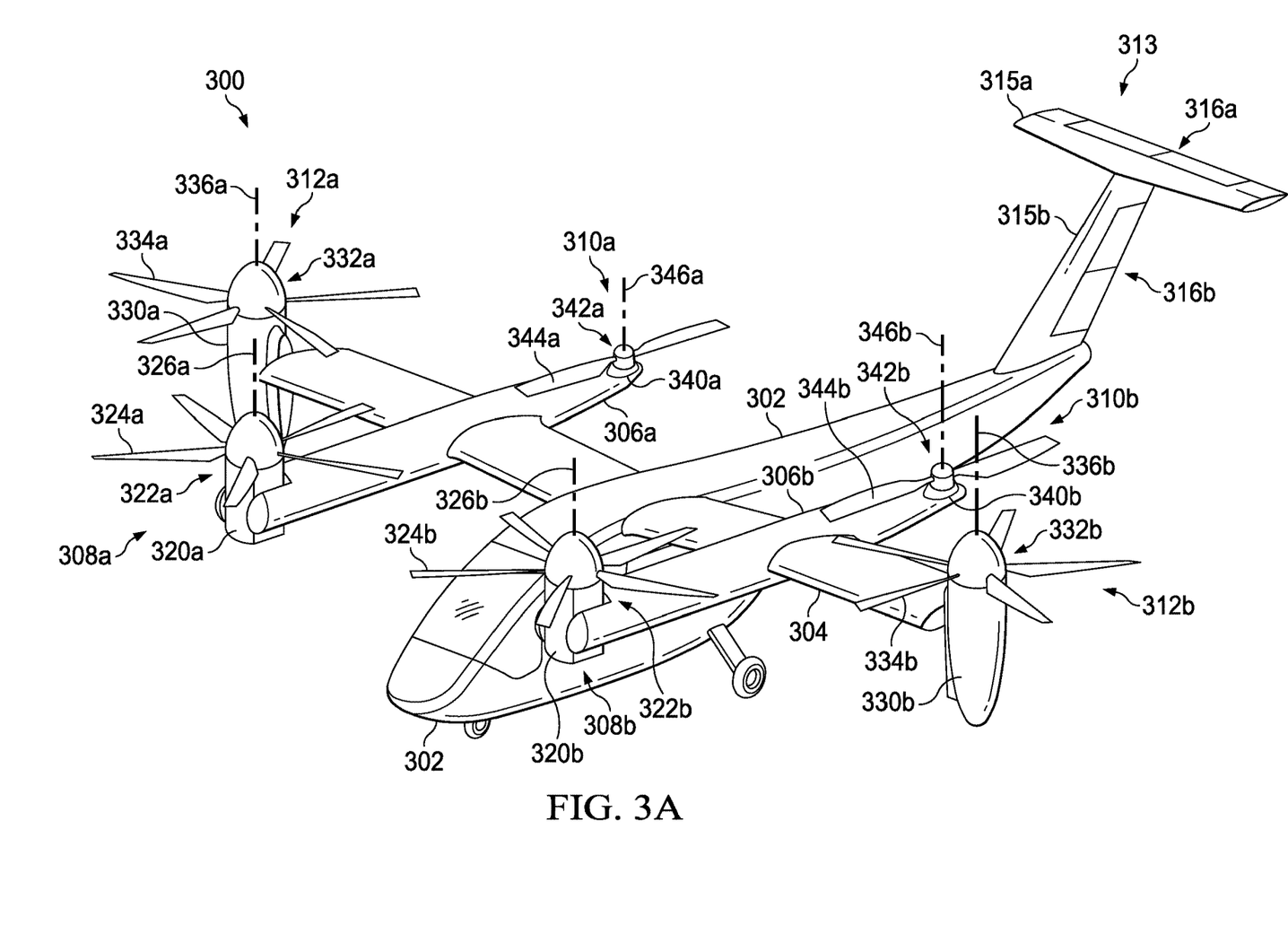
FIGS. 3A-3B illustrate a tiltrotor aircraft having a tilting hexrotor configuration in accordance with other embodiments describe herein.
Figure 3B:
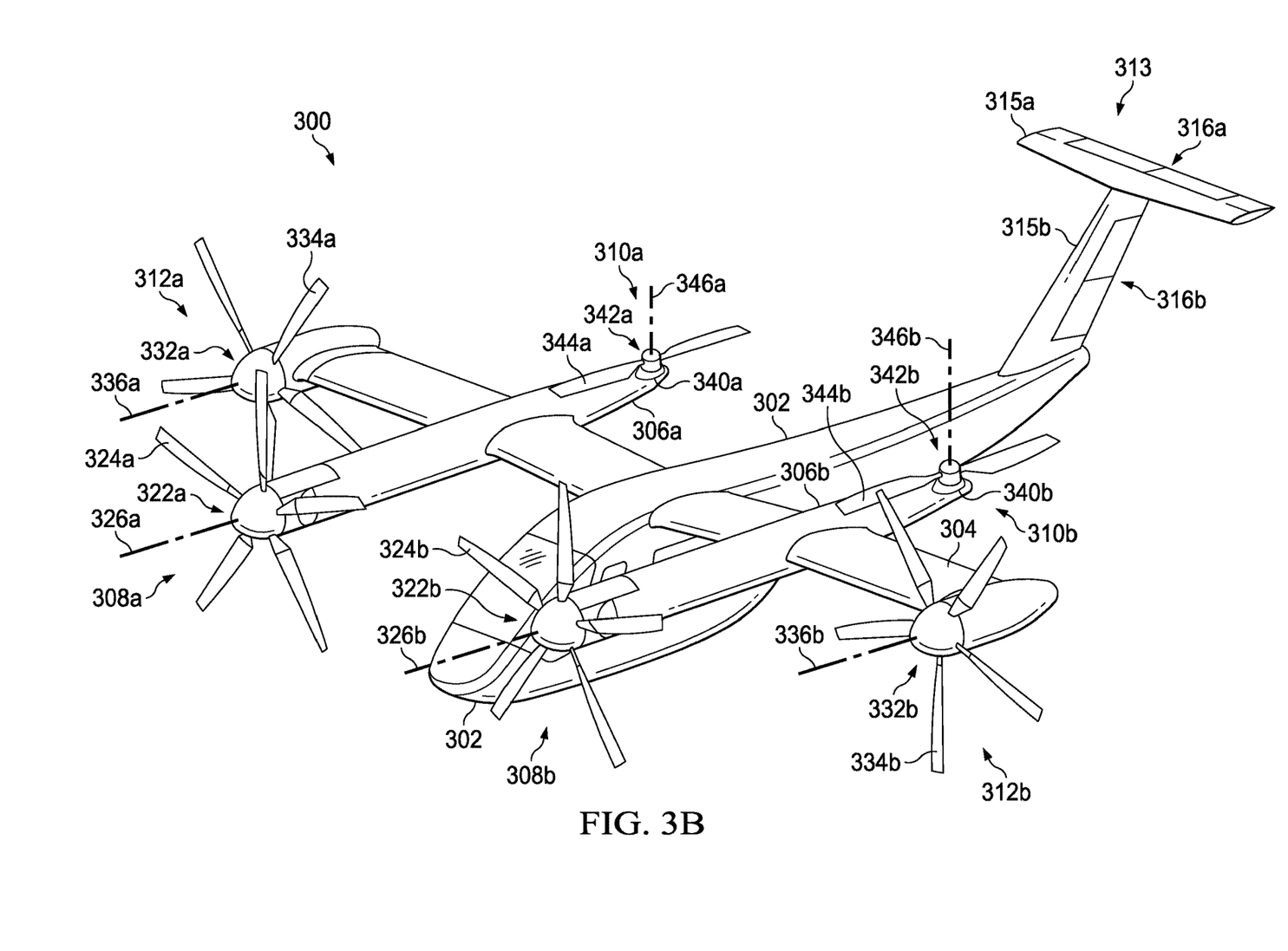

FIGS. 3A-3B illustrate another example tiltrotor aircraft 300 that is convertible between a VTOL or hover (also commonly referred to as helicopter) mode (shown in FIG. 3A), which allows for vertical takeoff and landing, hovering, and low speed directional movement, and a cruise (also commonly referred to as airplane) mode (shown in FIG. 3B), which allows for forward flight as well as horizontal takeoff and landing. Aircraft 300 includes a fuselage 302, wing 304, and booms 306a, 306b, connected to the wing on opposite sides of the fuselage 302. In accordance with features of embodiments described herein, aircraft further includes three pairs of propulsion systems, including forward propulsion systems 308a, 308b, adjacent to the forward end of the fuselage 302, aft propulsion systems 310a, 310b, adjacent to the aft end of the fuselage 302, and a pair of wing-mounted propulsion systems 312a, 312b, proximate opposite tips of wing 304. In the illustrated embodiment, forward propulsion systems 308a, 308b, are attached to forward ends of booms 306a, 306b, respectively, and aft propulsion systems 310a, 310b, are attached to booms 306a, 306b, respectively, proximate aft ends thereof.

Aircraft 300 further includes a tail assembly 313 at an aft end thereof. In the embodiment illustrated in FIGS. 3A-3B, the tail assembly 313 is disposed on the aft end of the fuselage 302 and comprises a T-tail configuration including a horizontal stabilizer 310a supported above the fuselage 302 by a vertical stabilizer 315b. Control surfaces 316a, 316b, are disposed on trailing edges of stabilizers 315a, 315b, and may comprise one or more elevators (e.g., control surface 316a) and one or more rudders (e.g., control surface 316b) for providing yaw and pitch control in certain embodiments. In certain embodiments, each of the control surfaces 316a, 316b, may comprise multiple independently controllable segments.

In the illustrated embodiment, each forward propulsion system 308a, 308b, includes a drive system housing comprising a pylon 320a, 320b, and a rotatable open rotor assembly 322a, 322b, comprising a plurality of rotor blades 324a, 324b, connected to a rotor mast and configured to rotate about a rotor axis 326a, 326b. As shown in FIGS. 3A and 3B, each rotor assembly 322a, 322b, includes five (5) rotor blades; however, it should be recognized that more or fewer blades may be implemented without departing from the spirit and the scope of the embodiments described. Rotation of rotor blades 324a, 324b, about rotor axis 326a, 326b, generates lift while operating in helicopter mode and thrust while operating in airplane mode. Each pylon 320a, 320b, may house one or more electric motors therein configured to produce rotational energy that drives the rotation of rotor assembly 322a, 322b. Alternatively, each pylon 320a, 320b, may house a gearbox therein that drives the rotation of rotor assembly 322a, 322b, wherein the gearbox receives rotational energy from a driveshaft or gear. The driveshaft may be driven remotely by an electric motor located some distance away or may be directly coupled to electric motor.

In the illustrated embodiment, each wing-mounted propulsion system 312a, 312b, includes a drive system housing comprising a pylon 330a, 330b, and a rotatable open rotor assembly 332a, 332b, comprising a plurality of rotor blades 334a, 334b, connected to a rotor mast and configured to rotate about a rotor axis 336a, 336b. As shown in FIGS. 3A and 3B, each rotor assembly 332a, 332b, includes five (5) rotor blades; however, it should be recognized that more or fewer blades may be implemented without departing from the spirit and the scope of the embodiments described. It should also be recognized that rotor assemblies 332a, 332b, may include a different number of rotor blades than rotor assemblies 322a, 322b. Rotation of rotor blades 334a, 334b, about rotor axis 336a, 336b, generates lift while operating in helicopter mode and thrust while operating in airplane mode. Each pylon 330a, 330b, may house one or more electric motors therein configured to produce rotational energy that drives the rotation of rotor assembly 332a, 332b. Alternatively, each pylon 330a, 330b, may house a gearbox therein that drives the rotation of rotor assembly 332a, 332b, wherein the gearbox receives rotational energy from a driveshaft.

In the illustrated embodiment, each aft propulsion system 310a, 310b, includes a drive system comprising a pylon 340a, 340b, and a rotatable open rotor assembly 342a, 342b, comprising a plurality of rotor blades 344a, 344b, connected to a rotor mast and configured to rotate about a rotor axis 346a, 346b. As shown in FIGS. 3A and 3B, each rotor assembly 342a, 342b, includes two (2) rotor blades; however, it should be recognized that more or fewer blades on a single or stacked rotor may be implemented without departing from the spirit and the scope of the embodiments described. Rotation of rotor blades 344a, 344b, about rotor axis 346a, 346b, generates lift while operating in helicopter mode. Each pylon 340a, 340b, may house one or more electric motors therein configured to produce rotational energy that drives the rotation of rotor assembly 342a, 342b. Alternatively, each pylon 340a, 340b, may house a gearbox therein that drives the rotation of rotor assembly 342a, 342b, wherein the gearbox receives rotational energy from a driveshaft. While operating in cruse mode, the rotor blades 344a, 344b, may cease rotation or be caused to rotate in a minimum power state. It will be recognized that while rotor assemblies 342a, 342b, are illustrated as being disposed above (i.e., on top of) booms 304a, 304b, they may alternatively be disposed below (i.e., on the underside of) booms and the distance from rotor to boom may vary or there may be rotor above and below the pylon as yet another alternative.

As noted above, as an alternative to using fairings to reduce rotor-boom noise, the rotor assemblies 342a, 342b, are connected to booms 306a, 306b, proximate aft ends thereof thereby minimizing overlap of the aft arc of the rotor with the boom, resulting in reduced rotor-boom interaction and reduced rotor-boom noise.

In accordance with features of embodiments described herein, and as illustrated in FIGS. 3A and 3B, wing-mounted propulsion systems 312a, 312b, are connected to outboard ends of wing 304. In certain embodiments, wing-mounted propulsion systems 312a, 312b, tilt relative to wing 304 between a first position (FIG. 3A), in which propulsion systems 312a, 312b, are configured in a hover mode, and a second position (FIG. 3B), in which propulsion systems 312a, 312b, are configured in a cruise mode. Similarly, forward propulsion systems 308a, 308b, (and more specifically, pylons 320a, 320b) are tiltably connected to forward ends of booms 306a, 306b, such that they may be tilted between a first position (FIG. 3A), in which propulsion systems 308a, 308b, are configured in a hover mode, and a second position (FIG. 3B), in which propulsion systems 308a, 308b, are configured in a cruise mode. In accordance with features of embodiments described herein, aft propulsion systems 310a, 310b, are fixedly attached to booms 306a, 306b, proximate aft ends thereof and do not convert between hover mode (FIG. 3A) and cruise mode (FIG. 3B).

The position of rotor assemblies 322a, 322b, 332a, 332b, as well as the pitch of individual rotor blades 324a, 324b, 334a, 334b, 344a, 344b, can be selectively controlled in order to selectively control direction, thrust, and lift of aircraft 300. As previously noted, propulsion systems 308a, 308b, 312a, 312b, are each convertible, relative to fuselage 302, between a vertical position, as shown in FIG. 3A, and a horizontal position, as shown in FIG. 3B. Propulsion systems 308a, 308b, 312a, 312b, are in the vertical position during vertical takeoff and landing mode. Vertical takeoff and landing mode may be considered to include hover operations of aircraft 300. Propulsion systems 308a, 308b, 312a, 312b, are in the horizontal position during forward flight mode, in which aircraft 300 is in forward flight. In forward flight mode, propulsion systems 308a, 308b, 312a, 312b, direct their respective thrusts in the aft direction to propel aircraft 300 forward. Aircraft 300 is operable to fly in all directions during the vertical takeoff and landing mode configuration of FIG. 3A, although faster forward flight is achievable while in the forward flight mode configuration of FIG. 3B. Propulsion systems 308a, 308b, 312a, 312b, may be tiltable between the vertical and horizontal positions by actuators (not shown) that are tiltable in response to commands originating from a pilot and/or a flight control system.

It should be noted that, although propulsion systems 308a, 308b, are shown and described as being tiltable between cruise and hover positions, those propulsion systems may be fixed in the hover positions, similarly to propulsion systems 310a, 310b. Additionally and/or alternatively, propulsion systems 312a, 312b, may be connected to opposite ends of wing 304 such that only pylons 330a, 330b, or a portion thereof, are tiltable relative to wing 304. The tiltable pylons 330a, 330b and 308a and 308b may also be differentially tiltable and may vary in power to control yaw of the aircraft whereas different thrust for roll and pitch is controlled through differential blade pitch, rpm, and motor power.

In accordance with features of embodiments described herein, when aircraft 300 is in cruise mode, rotor assemblies 342a, 342b, may cease rotation. In alternative embodiments rotor assemblies 342a, 342b, may be caused to rotate in a minimum power state when the aircraft 300 is in cruise mode. In embodiments in which propulsion systems 308a, 308b, are also fixed (i.e., do not convert between hover and cruise modes), rotor assemblies 322a, 322b, may also cease rotation when aircraft 300 is in cruise mode. Fewer active rotor assemblies in cruise mode improves propulsive efficiency of the aircraft. In addition, stopping the aft rotors avoids ingestion of the wakes from the forward rotors, which would make the aft rotors less efficient. With six rotor assemblies, a rotor assembly can be lost while still allowing aircraft 300 to hover even without motor redundancy per rotor assembly. In the event of a rotor failure, the rotor on the opposite side of the aircraft would be powered down, allowing the aircraft to hover as a quad copter with the four remaining rotors operating at elevated power levels. In accordance with features of embodiments described herein, if the aft left rotor were to fail, the forward right rotor would also be powered down, allowing the thrust on the remaining rotors to balance. Electric power to the motors allows the distributed nature of the aircraft 300 to stay weight efficient without requiring extensive cross-connects.

It should be appreciated that aircraft illustrated herein, such as aircraft 100 and 300, are merely illustrative of a variety of aircraft that can implement the embodiments disclosed herein. Indeed, the various embodiments of the electric drive system line replaceable unit described herein may be used on any aircraft that utilizes motors. Other aircraft implementations can include hybrid aircraft, tiltrotor aircraft, quad tiltrotor aircraft, unmanned aircraft, gyrocopters, airplanes, helicopters, commuter aircraft, electric aircraft, hybrid-electric aircraft, and the like. As such, those skilled in the art will recognize that the embodiments described herein for an electric drive system line replaceable unit can be integrated into a variety of aircraft configurations. It should be appreciated that even though aircraft are particularly well-suited to implement the embodiments of the present disclosure, non-aircraft vehicles and devices can also implement the embodiments.

The components of rotor assemblies described herein may comprise any materials suitable for use with an aircraft rotor. For example, rotor blades and other components may comprise carbon fiber, fiberglass, or aluminum; and rotor masts and other components may comprise steel or titanium.

Example 1 provides an aircraft comprising a fuselage; a wing connected to the fuselage; first and second booms connected to the wing on opposite sides of the fuselage; first and second forward propulsion systems attached to forward ends of the first and second booms; first and second aft propulsion systems fixedly attached proximate aft ends of the first and second booms; first and second wing-mounted propulsion systems connected to outboard ends of wings; and a tail connected to an aft end of the fuselage, the tail comprising a pair of airfoils arranged in a V-shape; wherein the first and second wing-mounted propulsion systems are tiltable between a first position when the aircraft is in a hover mode and a second position when the aircraft is in a cruise mode; and wherein each of the propulsion systems includes a rotor assembly comprising a plurality of rotor blades.

Example 2 provides the aircraft of example 1, further comprising first and second wing tips fixedly connected to outboard sides of the first and second wing-mounted propulsion systems.

Example 3 provides the aircraft of example 2, wherein the first and second wing-mounted propulsion systems and the first and second wing tips are collectively tiltable between a first position when the aircraft is in a hover mode and a second position when the aircraft is in a cruise mode.

Example 4 provides the aircraft of any of examples 1-3, wherein the rotor assemblies of the first and second aft propulsion systems rotate when the aircraft is in the hover mode and cease to rotate when the aircraft is in the cruise mode.

Example 5 provides the aircraft of any of examples 1-4, wherein the first and second forward propulsion systems are tiltably connected to forward ends of the first and second booms such that the first and second forward propulsion systems are tiltable between a first position when the aircraft is in the hover mode and a second position when the aircraft is in the cruise mode.

Example 6 provides the aircraft of any of examples 1-5, wherein the first and second forward propulsion systems are fixedly attached to the forward ends of the first and second booms.

Example 7 provides the aircraft of example 6, wherein the rotor assemblies of the first and second forward propulsion systems rotate when the aircraft is in the hover mode and cease to rotate when the aircraft is in the cruise mode.

Example 8 provides the aircraft of any of examples 1-7, wherein the airfoils extend from a top surface of the fuselage at an angle $\Theta_2$ from one another, wherein $\Theta_2$ is selected from the range consisting of 30 to 330 degrees.

Example 9 provides the aircraft of any of examples 1-8, wherein at least one of the airfoils extends from a top surface of the fuselage at an angle $\Theta_1$ from vertical, wherein $\Theta_1$ is less than 180 degrees.

Example 10 provides the aircraft of any of examples 1-9, further comprising control surfaces on trailing edges of the airfoils.

Example 11 provides the aircraft of example 10, wherein each of the control surfaces comprises multiple independently controlled segments.

Example 12 provides the aircraft of any of examples 1-11, wherein the wing is disposed on a top surface of the fuselage.

Example 13 provides the aircraft of any of examples 1-12, wherein a portion of each of the booms is integrated into the wing.

Example 14 provides the aircraft of any of examples 1-13, wherein the propulsion systems collectively comprise a hexrotor arc when the aircraft is in the hover mode.

Example 15 provides the aircraft of any of examples 1-14, wherein the first and second forward propulsion systems are located forward of the first and second wing-mounted propulsion systems.

Example 16 provides the aircraft of any of examples 1-15, wherein the first and second wing-mounted propulsion systems are located outboard of the first and second forward propulsion systems.

Example 17 provides the aircraft of any of examples 1-16, wherein the first and second aft propulsion systems are attached to a top surface of the first and second booms such that the rotor assemblies rotate above the first and second booms.

Example 18 provides the aircraft of any of examples 1-17, wherein the first and second aft propulsion systems are attached to a bottom surface of the first and second booms such that the rotor assemblies rotate below the first and second booms.

Example 19 provides an aircraft comprising a fuselage; a wing connected to the fuselage; first and second booms connected to the wing on opposite sides of the fuselage; first and second forward propulsion systems attached to forward ends of the first and second booms; first and second aft propulsion systems fixedly attached proximate aft ends of the first and second booms; first and second wing-mounted propulsion systems connected to outboard ends of wings; and a tail assembly connected to an aft end of the fuselage, the tail assembly comprising a vertical stabilizer having a first end connected to the aft end of the fuselage and a second end connected to a horizontal stabilizer; wherein the first and second wing-mounted propulsion systems are tiltable between a first position when the aircraft is in a hover mode and a second position when the aircraft is in a cruise mode; and wherein each of the propulsion systems includes a rotor assembly comprising a plurality of rotor blades.

Example 20 provides the aircraft of example 19, wherein the rotor assemblies of the first and second aft propulsion systems rotate when the aircraft is in the hover mode and cease to rotate when the aircraft is in the cruise mode.

Example 21 provides the aircraft of any of examples 19-20, wherein the first and second forward propulsion systems are tiltably connected to forward ends of the first and second booms such that the first and second forward propulsion systems are tiltable between a first position when the aircraft is in the hover mode and a second position when the aircraft is in the cruise mode.

Example 22 provides the aircraft of any of examples 19-21, wherein the first and second forward propulsion systems are fixedly attached to the forward ends of the first and second booms.

Example 23 provides the aircraft of example 22, wherein the rotor assemblies of the first and second forward propulsion systems rotate when the aircraft is in the hover mode and cease to rotate when the aircraft is in the cruise mode.

Example 24 provides the aircraft of any of examples 19-23, wherein the tail assembly comprises a T-tail.

Example 25 provides the aircraft of any of examples 19-24, further comprising control surfaces on trailing edges of the vertical stabilizer and the horizontal stabilizer.

Example 26 provides the aircraft of example 25, wherein each of the control surfaces comprises multiple independently controlled segments.

Example 27 provides the aircraft of any of examples 19-26, wherein the wing is disposed on a top surface of the fuselage.

Example 28 provides the aircraft of any of examples 19-27, wherein a portion of each of the booms is integrated into the wing.

Example 29 provides the aircraft of any of examples 19-28, wherein the propulsion systems collectively comprise a hexrotor arc when the aircraft is in the hover mode.

Example 30 provides the aircraft of any of examples 19-29, wherein the first and second forward propulsion systems are located forward of the first and second wing-mounted propulsion systems.

Example 31 provides the aircraft of any of examples 19-30, wherein the first and second wing-mounted propulsion systems are located outboard of the first and second forward propulsion systems.

Example 32 provides the aircraft of any of examples 19-31, wherein the first and second aft propulsion systems are attached to a top surface of the first and second booms such that the rotor assemblies rotate above the first and second booms.

Example 33 provides the aircraft of any of examples 19-32, wherein the first and second aft propulsion systems are attached to a bottom surface of the first and second booms such that the rotor assemblies rotate below the first and second booms.

Example 34 provides the aircraft of any of examples 19-33, further comprising first and second wing tips fixedly connected to outboard sides of the first and second wing-mounted propulsion systems.

Example 35 provides the aircraft of example 34, wherein the first and second wing-mounted propulsion systems and the first and second wing tips are collectively tiltable between a first position when the aircraft is in a hover mode and a second position when the aircraft is in a cruise mode.

Example 36 provides an electric vertical takeoff and landing aircraft (eVTOL) selectively convertible between a hover mode and a cruise mode, the eVTOL comprising a fuselage; a wing connected to a top surface of the fuselage and having opposite outboard ends; first and second booms connected to the wing on opposite sides of the fuselage and including forward ends disposed forward of the wing and aft ends disposed aft of the wing; first and second forward propulsion systems attached to the forward ends of the first and second booms; first and second aft propulsion systems fixedly attached proximate the aft ends of the first and second booms; first and second wing-mounted propulsion systems connected to outboard ends of wings, wherein each of the first and second wing-mounted propulsion systems includes a pylon for housing a drive system and a wing tip fixedly connected to an outboard side of the pylon; and a tail assembly on an aft end of the fuselage, the tail assembly comprising at least one of a T-tail and a V-tail; wherein each of the pylons is tiltable relative to the wing between a first position when the aircraft is in a hover mode and a second position when the aircraft is in a cruise mode; and wherein each of the propulsion systems includes a rotor assembly comprising a plurality of rotor blades.

Example 37 provides the eVTOL of example 36, wherein the tail assembly comprises a pair of airfoils each connected at one end to the aft end of the fuselage and wherein at least one of the airfoils extends from a top surface of the fuselage at an angle $\Theta_1$ from vertical, wherein $\Theta_1$ is less than 180 degrees.

Example 38 provides the eVTOL of any of examples 36-37, wherein the tail assembly comprises a vertical stabilizer and a horizontal stabilizer and wherein a first end of the vertical stabilizer is connected to the aft end of the fuselage and a second end of the vertical stabilizer is connected to the horizontal stabilizer.

Example 39 provides the eVTOL of any of examples 36-38, further comprising control surfaces on trailing edges of the tail assembly.

Example 40 provides the eVTOL of example 39, wherein each of the control surfaces comprises multiple independently controlled segments.

At least one embodiment is disclosed, and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, Rl, and an upper limit, Ru, is disclosed, any number falling within the range is specifically disclosed. In particular, the following numbers within the range are specifically disclosed: R=Rl+k*(Ru−Rl), wherein k is a variable ranging from 1 percent to 100 percent with a 1 percent increment, i.e., k is 1 percent, 2 percent, 3 percent, 4 percent, 5 percent, . . . 50 percent, 51 percent, 52 percent, . . . , 95 percent, 96 percent, 95 percent, 98 percent, 99 percent, or 100 percent. Moreover, any numerical range defined by two R numbers as defined in the above is also specifically disclosed. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present invention. Also, the phrases "at least one of A, B, and C" and "A and/or B and/or C" should each be interpreted to include only A, only B, only C, or any combination of A, B, and C.

The diagrams in the FIGURES illustrate the architecture, functionality, and/or operation of possible implementations of various embodiments of the present disclosure. Although several embodiments have been illustrated and described in detail, numerous other changes, substitutions, variations, alterations, and/or modifications are possible without departing from the spirit and scope of the present disclosure, as defined by the appended claims. The particular embodiments described herein are illustrative only and may be modified and practiced in different but equivalent manners, as would be apparent to those of ordinary skill in the art having the benefit of the teachings herein. Those of ordinary skill in the art would appreciate that the present disclosure may be readily used as a basis for designing or modifying other embodiments for carrying out the same purposes and/or achieving the same advantages of the embodiments introduced herein. For example, certain embodiments may be implemented using more, less, and/or other components than those described herein. Moreover, in certain embodiments, some components may be implemented separately, consolidated into one or more integrated components, and/or omitted. Similarly, methods associated with certain embodiments may be implemented using more, less, and/or other steps than those described herein, and their steps may be performed in any suitable order.

Numerous other changes, substitutions, variations, alterations, and modifications may be ascertained to one of ordinary skill in the art and it is intended that the present disclosure encompass all such changes, substitutions, variations, alterations, and modifications as falling within the scope of the appended claims.

One or more advantages mentioned herein do not in any way suggest that any one of the embodiments described herein necessarily provides all the described advantages or that all the embodiments of the present disclosure necessarily provide any one of the described advantages. Note that in this specification, references to various features included in "one embodiment", "example embodiment", "an embodiment", "another embodiment", "certain embodiments", "some embodiments", "various embodiments", "other embodiments", "alternative embodiment", and the like are intended to mean that any such features are included in one or more embodiments of the present disclosure but may or may not necessarily be combined in the same embodiments.

As used herein, unless expressly stated to the contrary, use of the phrase "at least one of", "one or more of" and "and/or" are open ended expressions that are both conjunctive and disjunctive in operation for any combination of named elements, conditions, or activities. For example, each of the expressions "at least one of X, Y and Z", "at least one of X, Y or Z", "one or more of X, Y and Z", "one or more of X, Y or Z" and "A, B and/or C" can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z. Additionally, unless expressly stated to the contrary, the terms "first", "second", "third", etc., are intended to distinguish the particular nouns (e.g., blade, rotor, element, device, condition, module, activity, operation, etc.) they modify. Unless expressly stated to the contrary, the use of these terms is not intended to indicate any type of order, rank, importance, temporal sequence, or hierarchy of the modified noun. For example, "first X" and "second X" are intended to designate two X elements that are not necessarily limited by any order, rank, importance, temporal sequence, or hierarchy of the two elements. As referred to herein, "at least one of", "one or more of", and the like can be represented using the "(s)" nomenclature (e.g., one or more element(s)).

In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph (f) of 35 U.S.C. Section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. An aircraft comprising:
   a fuselage;
   a wing connected to the fuselage;
   a tail assembly at an aft end of the fuselage, the tail assembly comprising a pair of airfoils arranged in a V-shape;

a first boom connected to a first side of the fuselage and a first side of the tail assembly;
a second boom connected to a second, opposite side of the fuselage and a second, opposite side of the tail assembly;
exactly six propulsion systems comprising:
first and second forward propulsion systems attached to forward ends of the first and second booms;
first and second aft propulsion systems fixedly attached proximate aft ends of the first and second booms, wherein each of the first and second aft propulsion systems is attached to a surface of the respective one of the booms such that an axis of rotation of the aft propulsion system forms a non-zero angle outboard from a vertical axis;
a first wing-mounted propulsion system connected to a first side of the wing and having a first canted wing tip at a first outboard end of the wing; and
a second-mounted propulsion system connected to a second, opposite side of the wing and having a second canted wing tip at a second outboard end of the wing;
wherein the first and second wing-mounted propulsion systems are tiltable with the first and second canted wing tips between a first position when the aircraft is in a hover mode and a second position when the aircraft is in a cruise mode; and
wherein each of the propulsion systems includes a rotor assembly comprising a plurality of rotor blades.

2. The aircraft of claim 1, wherein the rotor assemblies of the first and second aft propulsion systems rotate when the aircraft is in the hover mode and cease to rotate when the aircraft is in the cruise mode.

3. The aircraft of claim 1, wherein the first and second forward propulsion systems are tiltably connected to forward ends of the first and second booms such that the first and second forward propulsion systems are tiltable between a first position when the aircraft is in the hover mode and a second position when the aircraft is in the cruise mode.

4. The aircraft of claim 1, wherein the first and second forward propulsion systems are fixedly attached to the forward ends of the first and second booms.

5. The aircraft of claim 1, wherein the airfoils extend from a top surface of the fuselage at an angle $\Theta_2$ from one another, wherein $\Theta_2$ is selected from the range consisting of 30 to 330 degrees.

6. The aircraft of claim 1, further comprising control surfaces on trailing edges of the airfoils.

7. The aircraft of claim 6, wherein each of the control surfaces comprises multiple independently controlled segments.

8. The aircraft of claim 1, wherein the propulsion systems collectively comprise a hexrotor arc when the aircraft is in the hover mode.

9. An aircraft comprising:
a fuselage;
a wing connected to the fuselage, the wing comprising canted wing tips on opposite ends thereof;
first and second booms connected to the wing on opposite sides of the fuselage;
no more than six propulsion systems, the no more than six propulsion systems comprising:
first and second forward propulsion systems attached to forward ends of the first and second booms;
first and second aft propulsion systems fixedly attached proximate aft ends of the first and second booms, wherein each of the first and second aft propulsion systems is attached to a surface of the respective one of the booms such that an axis of rotation of the aft propulsion system forms a non-zero angle outboard from a vertical axis; and
first and second wing-mounted propulsion systems connected proximate outboard ends of wings inboard of the canted wing tips; and
a tail assembly connected to an aft end of the fuselage, the tail assembly comprising a vertical stabilizer having a first end connected to the aft end of the fuselage and a second end connected to a horizontal stabilizer;
wherein the first and second wing-mounted propulsion systems are tiltable between a first position when the aircraft is in a hover mode and a second position when the aircraft is in a cruise mode; and
wherein each of the propulsion systems includes a rotor assembly comprising a plurality of rotor blades.

10. The aircraft of claim 9, wherein the first and second wing-mounted propulsion systems and the first and second wing tips are collectively tiltable between a first position when the aircraft is in a hover mode and a second position when the aircraft is in a cruise mode.

11. The aircraft of claim 9, wherein the tail assembly comprises a T-tail.

12. The aircraft of claim 9, further comprising control surfaces on trailing edges of the vertical stabilizer and the horizontal stabilizer.

13. An electric vertical takeoff and landing aircraft (eVTOL) selectively convertible between a hover mode and a cruise mode, the eVTOL comprising:
a fuselage;
a wing connected to a top surface of the fuselage and having opposite outboard ends, wherein the outboard ends are canted;
first and second booms connected to the wing on opposite sides of the fuselage and including forward ends disposed forward of the wing and aft ends disposed aft of the wing;
exactly six propulsion systems, the six propulsion systems comprising:
first and second forward propulsion systems attached to forward ends of the first and second booms;
first and second aft propulsion systems fixedly attached proximate aft ends of the first and second booms, wherein each of the first and second aft propulsion systems is attached to a surface of the respective one of the booms such that an axis of rotation of the aft propulsion system forms a non-zero angle outboard from a vertical axis; and
first and second wing-mounted propulsion systems connected proximate outboard ends of wings inboard of the canted outboard ends, wherein each of the first and second wing-mounted propulsion systems includes:
a pylon for housing a drive system; and
a tail assembly on an aft end of the fuselage, the tail assembly comprising at least one of a T-tail and a V-tail;
wherein each of the pylons is tiltable relative to the wing between a first position when the eVTOL is in a hover mode and a second position when the eVTOL is in a cruise mode; and
wherein each of the propulsion systems includes a rotor assembly comprising a plurality of rotor blades.

14. The eVTOL of claim 13, wherein the tail assembly comprises a pair of airfoils each connected at one end to the aft end of the fuselage and wherein at least one of the airfoils extends from a top surface of the fuselage at an angle $\Theta_1$ from vertical, wherein $\Theta_1$ is less than 180 degrees.

15. The eVTOL of claim 13, wherein the tail assembly comprises a vertical stabilizer and a horizontal stabilizer and wherein a first end of the vertical stabilizer is connected to the aft end of the fuselage and a second end of the vertical stabilizer is connected to the horizontal stabilizer.

16. The eVTOL of claim 13, further comprising control surfaces on trailing edges of the tail assembly.

17. The eVTOL of claim 16, wherein each of the control surfaces comprises multiple independently controlled segments.

\* \* \* \* \*